June 3, 1969  P. J. LAWRENSON  3,448,310

DYNAMO-ELECTRIC MACHINES OF THE RELUCTANCE TYPE

Filed Aug. 15, 1967

INVENTOR
Peter John Lawrenson
BY
Cushman, Darby & Cushman
ATTORNEYS

June 3, 1969     P. J. LAWRENSON     3,448,310

DYNAMO-ELECTRIC MACHINES OF THE RELUCTANCE TYPE

Filed Aug. 15, 1967

United States Patent Office 3,448,310
Patented June 3, 1969

3,448,310
DYNAMO-ELECTRIC MACHINES OF THE RELUCTANCE TYPE
Peter John Lawrenson, Leeds, England, assignor to National Research Development Corporation, London, England, a British corporation
Continuation-in-part of application Ser. No. 410,094, Nov. 10, 1964. This application Aug. 15, 1967, Ser. No. 660,742
Claims priority, application Great Britain, Nov. 12, 1963, 44,629/63
Int. Cl. H02k *19/06*
U.S. Cl. 310—162                    10 Claims

ABSTRACT OF THE DISCLOSURE

A reluctance machine in which the rotor has a lesser number of magnetic sections than the stator pole number. The sections may comprise saliencies or isolated segments of magnetic material and preferably the number of sections is half the stator pole number (the "semi-pole" machine). The rotor squirrel-cage winding may be arranged to provide more conducting material in the centres of the saliencies or segments and less between adjacent segments.

---

This invention relates to dynamo-electric machines of the reluctance type and is a continuation-in-part of my co-pending U.S. patent application Ser. No. 410,094, filed Nov. 10, 1964, now abandoned.

Reluctance machines comprise a stator having a single phase or multiphase A.C. winding arranged to provide a pulsating or rotating multipole magnetic field and a rotor provided with an electrical winding, usually of the squirrel-cage type, in which the magnetic material is arranged anisotropically so that when in one position relative to the magnetic field provided by the stator winding, termed the direct axis position, a low reluctance path is provided for magnetic flux from the stator, while when the rotor is 90° electrical relative to this position, termed the quadrature axis position, a path of high reluctance to magnetic flux from the stator is provided. In known forms of reluctance motor the rotor is provided with salient pole sections equal in number to the number of poles of the stator magnetic field.

The present invention comprises a dynamo-electric machine of the reluctance type in which the rotor is provided with a lesser number of sections of magnetic material than the number of poles for which the stator is wound.

Preferably the number of sections of magnetic material in the rotor is equal to half the stator pole number.

The magnetic sections of the rotor can be arranged in a similar manner to salient poles of conventional type or else a plurality of circumferentially extending segments of magnetic material can be provided isolated from each other by regions of high magnetic reluctance.

The circumferential gaps between the saliencies or the segments may be filled with conducting material forming part of the squirrel cage. However, improved performance is obtained if the amount of electrically conducting material is decreased or entirely eliminated in the space between the saliencies or the circumferential segments together with an increase in conducting material in the neighbourhood of a radial line through the centres of saliencies or segments.

In one arrangement this distribution of electrically conducting material may be provided by spacing the bars of the squirrel cage more widely apart between the saliencies or segments and positioning them more closely together in the central parts thereof.

Figure 1:
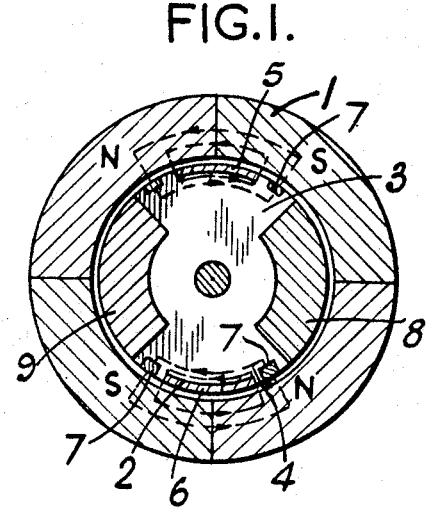
Figure 2:
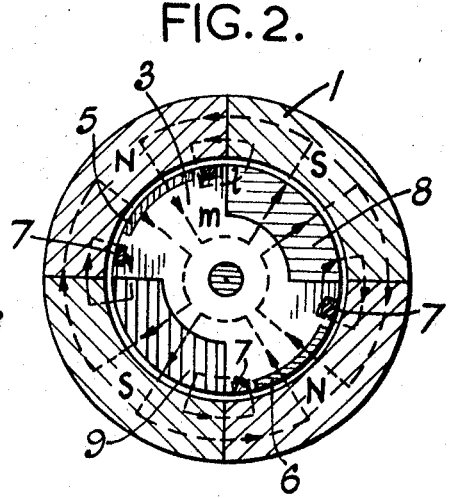
Figure 3:
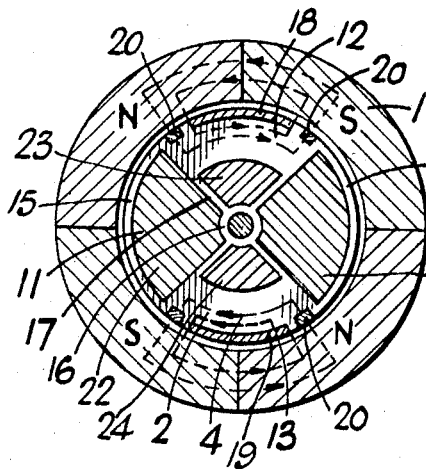
Figure 4:
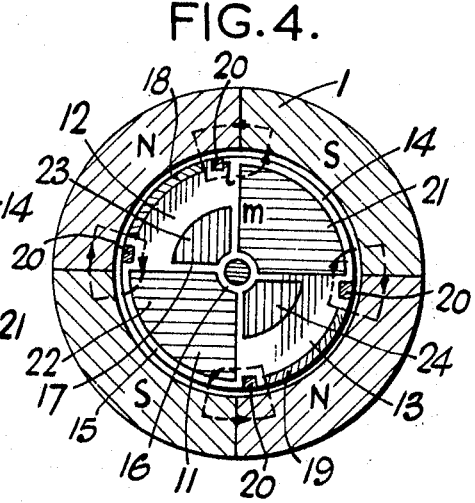
Figure 5:
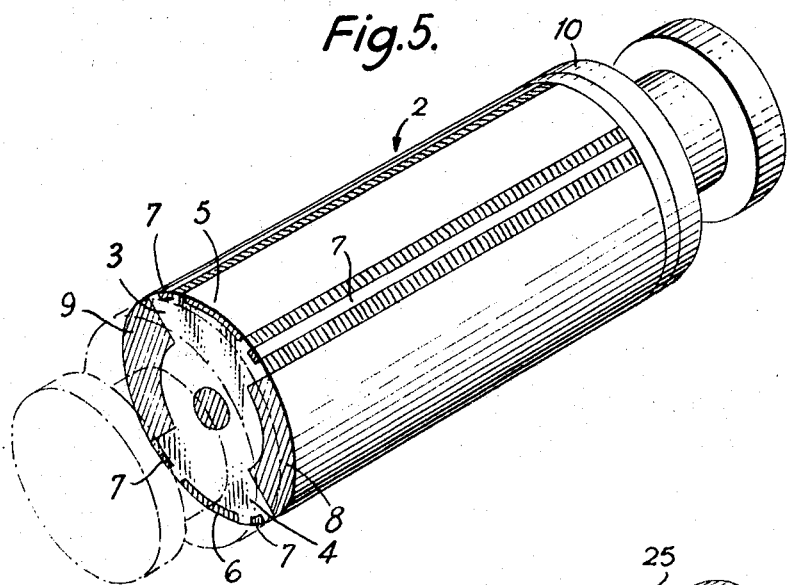
Figure 6:
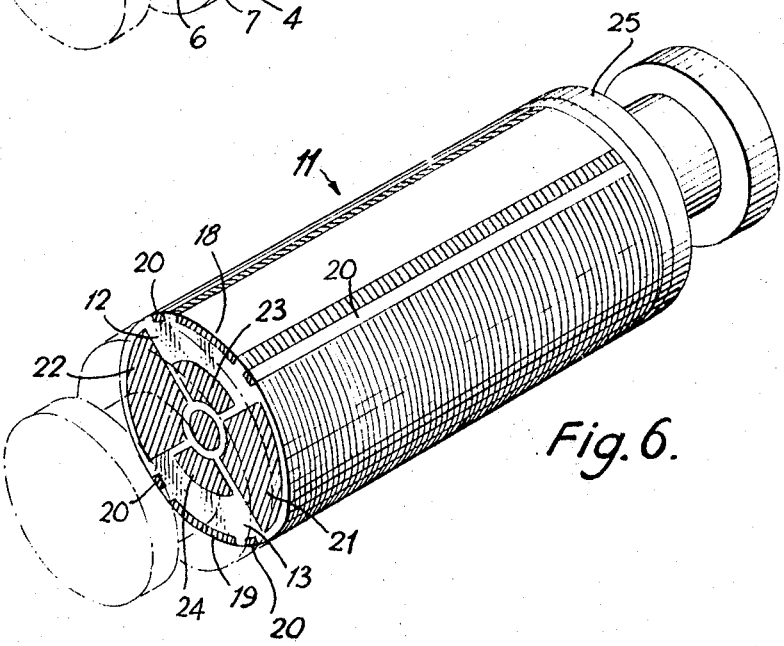
Figure 7:
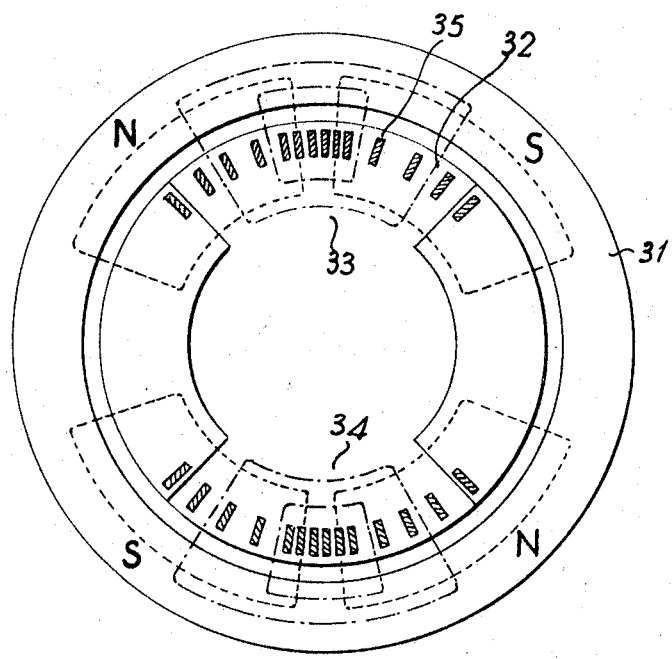

In order that the invention may be more fully understood reference will now be made to the drawings accompanying this invention in which:

FIGS. 1 and 2 illustrate in cross-section an embodiment of the invention employing a salient pole rotor and with the rotor in the direct axis position and quadrature axis position respectively, FIGS. 3 and 4 illustrate in cross-section an embodiment of the invention employing circumferential segments in the rotor and with the rotor in the direct axis position and quadrature axis position respectively, FIG. 5 illustrates in perspective a rotor constructed in accordance with the cross-section illustrated in FIG. 1 and 2, FIG. 6 illustrates in perspective a rotor constructed in accordance with the cross-section illustrated in FIGS. 3 and 4, and FIG. 7 illustrates in cross-section another embodiment of the invention in which the bars of the squirrel cage are unevenly distributed.

Referring now to FIG. 1 and FIG. 2 there is shown therein a reluctance motor comprising a stator 1 having a conventional multiphase winding arranged to provide a four-pole rotating field the instantaneous polarities of which are as marked. The machine is provided with a rotor 2 having its magnetic material arranged with two sections 3 and 4 of magnetic material arranged so that it is similar to a salient pole rotor that would be normally used in a two-pole reluctance motor. The pole arc of salient sections 3 and 4 is equal to 100% to 140% the pole pitch of the poles of the stator winding.

The faces of salient sections 3 and 4 are provided with shallow channels 5 and 6 in their centres which span some 10% to 60% of the pole faces. In addition electrically conductive bars 7 are provided in the remaining portions of the faces 3 and 4 in a similar manner to the bars of squirrel-cage winding. Both channels 5 and 6 and the non-magnetic portions 8 and 9 of the rotor are filled with conductive material and the squirrel-cage winding bars 7, the conducting materials in channels 5 and 6, and the conducting materials in regions 8 and 9 are all connected to end rings at opposite ends of the rotor of the kind similar to those provided in conventional squirrel-cage windings.

When the rotor 2 is in the position relative to the stator magnetic field shown in FIG. 1 it will be seen that the salient sections 3 and 4 provide low reluctance paths for flux linking the stator and rotor, typical paths for the flux lines being shown by the dotted lines. If the rotor is in the position shown in FIG. 2, namely 45° (mechanical) relative to its position in FIG. 1, the paths for flux from the stator through the rotor now extend not only through salient sections 3 and 4 but also through the relatively large regions of non-magnetic material that the rotor is provided with adjacent the salient sections. It is clear that the reluctance provided by the rotor when in the FIG. 2 position is considerably greater than its reluctance in the FIG. 1 position. Accordingly the machine behaves as a reluctance motor and the rotor will under suitable conditions lock onto the rotating stator field in the direct-axis position shown in FIG. 1 and rotate in synchronism with it.

FIG. 5 illustrates the rotor described above and like parts have like reference numerals to FIG. 1 and FIG. 2. FIG. 5 shows the end rings 10 to which the squirrel-cage winding bars 7 and the conducting material in channels 5 and 6 and in regions 8 and 9 are connected.

FIGS. 3 and 4 show an alternative embodiment of the invention in which a four-pole winding is provided on stator 1 as in FIGS. 1 and 2 but the rotor 11 is of a different form to the rotor illustrated in FIGS. 1 and 2 and comprises a pair of segments 12 and 13 of magnetic material each subtending an arc equal to 100% to 140% of a pole pitch of the stator winding. If it is desired to form the rotor 11 from complete ring stampings the segments 12 and 13 can be joined by thin bridging sections such as 14 and 15 and in addition can be secured to a central boss 16 arranged to be secured to the shaft of the machine by means of radial arms 17.

Segments 12 and 13 are also provided with shallow channels 18 and 19 in their peripheral faces similar to channels 5 and 6 in FIG. 1 and these channels are likewise filled with conducting material. In addition the segments 12 and 13 are also provided with conducting bars 20 in their peripheral faces. The regions of the rotor 21, 22, 23 and 24 which are outside the area of the stampings can be filled with canducting material connected to end rings at opposite ends of the rotor to which bars 20 and the conducting materials in channels 18 and 19 are also connected.

FIG. 6 illustrates the rotor described in connection with FIG. 3 and FIG. 4 and like parts have like reference numerals. FIG. 6 shows the end rings 25 to which the squirrel-cage winding bars 20, conducting material in channels 18 and 19 and the conducting material in regions 21, 22, 23, and 24 are connected.

From a comparison of the flux paths provided by the rotor in the respective positions shown in FIG. 3 and FIG. 4 it will be seen that the rotor provides a much lower reluctance to the stator magnetic field when in the position shown in FIG. 3 compared with the position shown in FIG. 4. Accordingly a machine having the rotor 11 illustrated in FIGS. 3 and 4 will behave as a reluctance motor and will in operation rotate in synchronism with the stator magnetic field with the rotor in the direct-axis position shown in FIG. 3, in like manner to the rotor illustrated in FIGS. 1 and 2.

The effect of the channels 5 and 6 in FIG. 1 and of channels 18 and 19 in FIG. 3 is to still further reduce the quadrature axis reluctance and so improve the performance of the machine.

The span of the salient sections 3 and 4 in FIG. 1 and the segments 12 and 13 in FIG. 3 is shown as equal to the pole pitch of the stator winding but it can take any value in the range 0.2 to 1.9 times the stator pole pitch. However, for most purposes the preferred value would be equal to or just greater than the stator pole pitch.

The advantages of these machines compared with conventional machines in which the rotor has a number of magnetic sections or poles equal to the number of poles on the stator is that the quadrature axis reluctance is much greater since the leakage of quadrature axis flux into the sides of the salient sections 3 and 4, and the sides of segments 12 and 13 is much reduced. Such leakage is exemplified by the paths $l$ and $m$. A further important advantage is that the concentration of the rotor squirrel-cage winding into fewer but longer peripheral sections (in the salient pole portions) than in a conventional machine, leads to improvements in transient performance in particular during pull-in.

In FIG. 7 there is shown therein a reluctance machine having a stator 31 of known construction and providing a four-pole field. The rotor 32 is constructed of stampings of magnetic material shaped to provide two salient poles 33 and 34, the stampings being of a similar shape to a conventional two-pole reluctance machine.

The rotor is provided with a squirrel-cage winding the conductor bars 35 of which are contained in slots and are arranged anisotropically. The arrangement is such that the amount of conductive material is increased in the neghbourhood of a radial line passing centrally through the pole pieces 33 and 34 but substantially reduced in the gaps between the pole pieces. As illustrated such increase is brought about by spacing the conductor bars closer together near the centres of the poles. Alternatively, or in addition, such increase may be brought about by an increase in the width of the bars.

With the stator magnetic field having the instantaneous polarities as marked in the figure the rotor will tend to take up the position shown, this being the direct axis position, and the magnetic flux linking the rotor will tend to follow the paths shown by the chain dotted lines. It will be seen that the direct axis flux passes through the squirrel cage at positions where there is a minimum amount of conductive material so that the saturation of the iron is a minimum whilst the flux linkage with the squirrel-cage winding is a maximum. The principal advantage of this arrangement is due to this latter feature. Because most of the conducting material and the regions of maximum current density now occur in positions where they most readily react with the main direct-axis flux in the rotor they are in the best position for producing torque during any asynchronous running. As a consequence the pull-in torque of the machine, particularly with high inertia loads, is greatly improved as also is the stability of the machine under synchronous conditions when driving a pulsating mechanical load or when supplied from a non-sinusoidal source of voltage. Furthermore the reduction of conducting material in the region of the direct axis where it does not contribute to torque prevents the rotor resistance from becoming unnecessarily low and hence the starting current unnecessarily high for given performance.

Finally, the presence of the additional conductive material in the region of the quadrature axis facilitates the reduction of the quadrature-axis reactance. When the rotor is in the quadrature axis position, which is when the stator field is 90 electrical degrees (45 mechanical degrees) relative to the position of the stator field marked in the figure and with the rotor in the same position as shown the quadrature axis flux shown by plain dotted lines has to traverse the air gap in the neighbourhood of the centre of the rotor salient poles where the conductive material is maximum and hence has a greater effect as a flux barrier. Where the conducting material is in the form of deep bars having thin sections of magnetic material between them the sections can saturate thus still further improving the effectiveness of the flux barrier formed by the increased amount of conductive material to the guadrature axis flux.

Similar discussion applies to the case of the segmental semi-pole machine not illustrated in this figure.

I claim:

1. A dynamo-electric machine comprising a stator wound to provide a rotating magnetic field having a plurality of poles and a rotor including magnetic material arranged in the form of a plurality of sections, the number of sections of the rotor being less than the number of poles of the stator.

2. The machine according to claim 1 in which the rotor is provided with a plurality of axially extending conductive members spaced apart circumferentially, and connections at opposite ends of the rotor joining together the ends of the said members.

3. A dynamo-electric machine comprising a stator wound to provide a rotating magnetic field having a plurality of poles and a rotor including magnetic material arranged in the form of a plurality of magnetic sections, the number of sections of the rotor being half the number of poles of the stator.

4. A dynamo-electric machine comprising a stator wound to provide a rotating magnetic field having a plurality of poles and a rotor including magnetic material in the form of a plurality of circumferentially extending segments isolated from each other by regions of high magnetic reluctance, and the number of segments of the rotor being less than the number of poles of the stator.

5. The machine according to claim 4 in which the number of segments of the rotor is half the number of poles of the stator.

6. A dynamo-electric machine comprising a stator wound to provide a rotating magnetic field having a plurality of poles and a rotor constructed of a stack of ring stampings of magnetic material in the form of a plurality of circumferentially extending segments joined by thin bridging sections and the regions between adjacent segments containing electrically conductive material connected together at the ends of the rotor, the number of segments being half the number of poles of the stator.

7. The machine according to claim 6 in which said ring stampings have shallow recesses in the peripheries of said segments, so that axially extending channels are formed in the rotor, said channels containing electrically conductive material and rings at opposite ends of said rotor connecting together the ends of said electrically conductive material.

8. The machine according to claim 2 in which the conductive members are distributed non-uniformly in a manner such that the cross-section of conductive material per unit are in the gaps between adjacent sections is less than in the sections.

9. The machine according to claim 8 in which the non-uniform distribution of conductive material is such that the cross-section of conductive material per unit arc is greatest in the central regions of the sections.

10. A dynamo-electric machine of the reluctance type comprising a stator wound to provide a rotating magnetic field having a plurality of poles and a rotor including magnetic material arranged in the form of a plurality of sections equal in number to half the stator pole number and including bars of electrically conductive material arranged to form a squirrel-cage winding, the bars being non-uniformly spaced apart so as to decrease the cross-section of conductive material in the gaps between adjacent sections and increase the cross-section of conductive material in the central parts of the sections.

References Cited

UNITED STATES PATENTS

| | | | |
|---|---|---|---|
| 3,113,230 | 12/1963 | Linkous | 310—162 |
| 3,210,584 | 10/1965 | Jorgensen | 310—162 |
| 3,243,620 | 3/1966 | Suhr | 310—162 |
| 3,389,281 | 6/1968 | Ellis | 310—168 |
| 3,394,295 | 7/1968 | Cory | 310—46 |

WARREN E. RAY, *Primary Examiner.*

R. SKUDY, *Assistant Examiner.*

U.S. Cl. X.R.

310—168, 211